United States Patent
Heil et al.

[15] 3,676,378
[45] July 11, 1972

[54] CONTINUOUS PRODUCTION OF EXPANDABLE THERMOPLASTICS

[72] Inventors: Eduard Heil, Limburgerhof; Hans-Georg Trieschmann, Hambach; Herbert Willersinn, Ludwigshafen; Herbert Bolte, Frankenthal; Klaus Bronstert, Carlsberg, all of Germany

[73] Assignee: Badische Anilin- & Soda-Fabrik Aktiengesellschaft, Ludwigshafen/Rhein, Land Rheinland-Pfalz, Germany

[22] Filed: March 25, 1970

[21] Appl. No.: 22,517

[30] Foreign Application Priority Data

Mar. 29, 1969 Germany................ P 19 16 220.0

[52] U.S. Cl. ............. 260/2.5 E, 260/2.5 HB, 260/2.5 B, 260/2.5 FP, 260/33.6 UA, 260/33.8 UA, 260/93.5 A, 264/53, 264/178, 264/348
[51] Int. Cl. ..................... C08f 47/10, C08f 33/02
[58] Field of Search.............. 260/2.5 E, 2.5 HB; 264/53, 264/178, 348

[56] References Cited

UNITED STATES PATENTS

| | | | |
|---|---|---|---|
| 3,026,273 | 3/1962 | Engles | 260/2.5 E |
| 3,026,272 | 3/1962 | Rubens et al. | 260/2.5 E |
| 3,150,214 | 9/1964 | Scalora et al. | 260/2.5 E |

Primary Examiner—Samuel H. Blech
Assistant Examiner—Wilbert J. Briggs, Sr.
Attorney—Johnston, Root, O'Keeffe, Keil, Thompson & Shurtleff

[57] ABSTRACT

Continuous production of styrene polymers which contain an expanding agent and which are in the form of granules by extrusion of a mixture of a melt of the polymer with the expanding agent and rapid cooling of the extruded mixture, wherein excess expanding agent is first mixed with the melt and then the excess of expanding agent is evaporated. In this way both the production of a homogeneous mixture and the cooling of the mixture prior to extrusion to temperatures just above the softening point of the mixture are facilitated.

4 Claims, 1 Drawing Figure

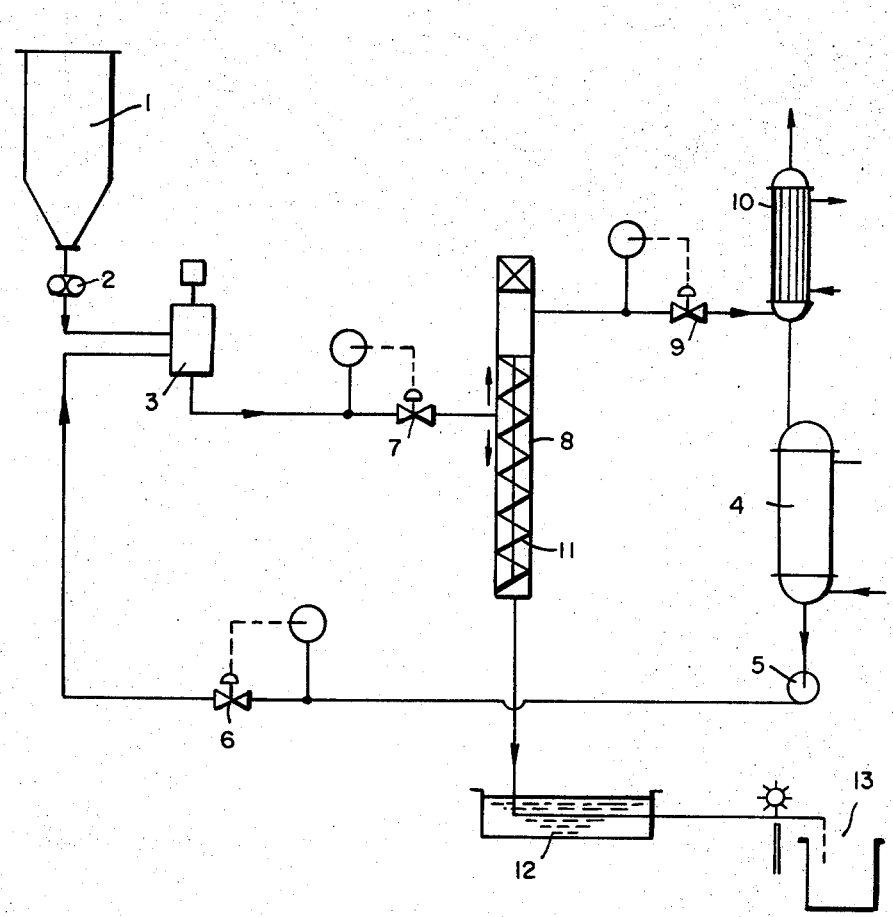

CONTINUOUS PRODUCTION OF EXPANDABLE THERMOPLASTICS

The invention relates to a process for the continuous production of expandable thermoplastics in the form of granules.

Methods are known in which polymer melts are mixed under pressure with expanding agents having relatively low boiling points and the mixture is then decompressed in such a way what expansion is avoided. Granules containing expanding agent which can be processed into expanded plastics are obtained by this method. Since in order to achieve expanded plastics having a uniform cellular structure the expanding agent has to be homogeneously dispersed throughout the polymer melt, intense mixing is necessary at a fairly high temperature. Owing to the necessary long residence time in the mixer, the latter must have sufficiently large dimensions. Moreover, the hot melt has to be cooled to a considerable extent prior to decompression if it is desired to obtain an expandable material devoid of cavities such as is used for the production of expanded articles having a uniform cellular structure. Expensive apparatus having large dimensions are again necessary in the prior art methods.

It is therefore an object of the invention to provide a process which enables expandable thermoplastics to be produced with simpler means and thus more economically.

We have now found that in a process for the continuous production of expandable thermoplastics by mixing a melt of a styrene polymer with an expanding agent (which under standard temperature and pressure conditions is gaseous or liquid) at a pressure which is higher than the vapor pressure of the expanding agent in the mixture followed by lowering the pressure with rapid cooling to temperatures below the boiling point of the expanding agent in the mixture this object can be achieved by incorporating into the polymer from 15 to 200 percent by weight of expanding agent at temperatures of 30° to 180° C above the glass temperature of the polymer and pressures above the vapor pressure of the expanding agent in the mixture, then evaporating from the mixture at pressures below the vapor pressure of the expanding agent in the melt such an amount of expanding agent that from 3 to 15 percent by weight thereof remains in the mixture, the mixture being thus cooled to 90° to 240° C, then raising the pressure above the vapor pressure of the expanding agent in the mixture and then depressuring the mixture with further cooling to temperatures of from 20° C above to 60° C below the glass temperature of the polymer containing expanding agent.

The advantages of the process are manifold. The problem of mixing the very mobile expanding agent with the viscous polymer melt completely homogeneously is solved in a simple manner by greatly decreasing the viscosity of the mixture by adding large amounts of expanding agent so that a completely homogenous mixture is obtained very much more rapidly. The problem of cooling the mixture, prior to the final decompression step, to temperatures of 90° to 240° C is also solved in a very simple way by the process according to the invention. Firstly, when large amounts of expanding agent are incorporated, temperatures do not have to be as high as when small amounts of expanding agent are incorporated and, secondly, the amount of heat to be withdrawn from the homogeneous mixture is then consumed by the evaporation of the excess expanding agent.

Homopolymers and copolymers of styrene which may contain up to 50 percent by weight of units of other monomers are suitable as polymers. Examples of suitable comonomers are acrylonitrile, methacrylonitrile, nuclear-halogenated and nuclear-alkylated styrenes, α-methylstyrene, esters of acrylic or methacrylic acid with alcohols having one to eight carbon atoms, N-vinyl compounds such as N-vinylcarbazole, acrylic acid, methacrylic acid, maleic acid, fumaric acid, maleic anhydride or small amounts of compounds containing two polymerizable double bonds such as butadiene, divinylbenzene or butanediol diacrylate. The styrene polymers may also contain elastomers, for example polybutadiene or polyisoprene, incorporated therein.

The polymers may also contain additives such as flame retardants, for example trisdibromopropyl phosphate, hexabromocyclododecane, chloroparaffins or synergists for the flame retardants such as ferrocene, organic peroxides and the like, as well as dyes and fillers.

Hydrocarbons which are gaseous or in particular liquid under standard conditions of temperature and pressure and which do not dissolve the polymer, such as fluorohalohydrocarbons or halohydrocarbons whose boiling point is lower than the softening point of the polymer are suitable as expanding agents. Examples of suitable expanding agents are aliphatic hydrocarbons having three to six carbon atoms such as cyclopentane, hexane, cyclohexane, dichlorodifluoromethane and trifluorochloromethane. The expanding agents are generally contained in the expandable polymers obtained according to the process in amounts of from 3 to 15 percent, preferably from 4 to 11%, by weight with reference to the polymer.

Mixing of the expanding agent with the polymer is carried out at from 30° to 180° C, preferably from 70° to 180° C, above the glass temperature of the polymer. The expanding agent should be mixed with the polymer under a pressure which is at least equal to the vapor pressure of the expanding agent. The pressure is advantageously 1 to 5 atmospheres above the vapor pressure of the expanding agent. From 15 to 200 percent, preferably 30 to 160 percent, by weight, with reference to the polymer, of expanding agent is incorporated into the polymer.

In a subsequent zone, such an amount of expanding agent is evaporated from the mixture at a pressure less than the vapor pressure of the expanding agent that from 3 to 15 percent, preferably four to 11 percent, by weight of expanding agent remains in the mixture. The mixture is thus cooled to from 90° to 240° C, i.e. the expanding agent is advantageously evaporated without the supply of heat so that the mixture is cooled because of the negative heat of vaporization of the expanding agent.

The mixture is then discharged from this zone, preferably through dies. The pressure is increased again to above the vapor pressure of the expanding agent in the mixture at the prevailing temperature and then falls (upon leaving the die). Immediately after this decompression or practically at the same time the melt is cooled as rapidly as possible to temperature of from 20 above to 60° C below the glass temperature of the polymer containing expanding agent. Cooling can be effected by introducing strands of the homogeneous mixture into a cooling bath. Water or an aqueous solution is advantageously used. It is advantageous to decompress to atmospheric pressure. Cooling may however also be carried out in a pressure zone containing the cooling bath, a pressure of 1 to 30 atmospheres gauge prevailing in the zone. The slightest expansion of the mixture is thus reliably avoided. The cooled strands are then comminuted in a conventional manner.

The homogeneous mixture may also be comminuted during cooling and decompression. This may be done with a granulator which is attached to the die through which the strand of mixture leaves.

Mixing of the excess expanding agent the polymer is advantageously carried out in a mixer which has separate feeds for the polymer melt, the expanding agent and other additives. A suitable mixer for example is a screw mixer, a mixer with vertical fingers or any other high-shear mixer.

The mixture of polymer and expanding agent is passed through a line and a decompression unit into a separator. The separator has a flash valve for the excess expanding agent. The separator contains a discharge means for the mixture of polymer and the remainder of the expanding agent. So-called devolatilizing extruders (continuous screw extruders which enable volatile constituents to be withdrawn) are preferred as separators. The flash valve of the separator may advantageously be connected via a condenser for the expanding agent to a collecting vessel.

The drawing illustrates diagrammatically an advantageous apparatus.

Polymer melt prepared in a reactor 1 is brought to a pressure which is higher than the vapor pressure of the expanding agent by means of a conveyor pump 2 and supplied to a mixer 3. Expanding agent stored in a vessel 4 is also brought by a pump 5 to a higher pressure and supplied via quantity control means 6 to the mixer 3. After the two components have been homogenized in the mixer 3 the mixture is flashed via a valve 7 into a separator 8, some of the expanding agent evaporating and thus cooling the mixture. The pressure in the separator 8 is kept constant by the valve 9 and the content of expanding agent in the mixture is thus fixed. The evaporated expanding agent is condensed in a condenser 10 and returned to the vessel 4. The cooled mixture is discharged from the separator by a screw 11 and supplied via a cooling bath 12 which is located immediately downstream thereof to a granulator 13.

Granules containing expanding agent obtained according to this invention may for example be expanded and fused together by heating to temperatures higher than the softening point in molds which are not gastight when closed to form molded articles. The granules may also be preexpanded in stages and then fused together.

The invention is illustrated by the following Examples. The percentages specified in the following Examples are by weight. The molecular weight is characterized by the K value (H. Fikentscher, Cellulose-Chemie, 13, 58 (1932) the measurements being carried out in a 1 percent solution in toluene as the solvent at 25° C.

EXAMPLE 1

20 kg of a polystyrene melt (K value 64; glass temperature 90° C) at a temperature of 245° C, 20 kg of n-pentane at room temperature and 2 kg of a 0.015 percent aqueous solution of ammonium sulfate are supplied to the middle of a screw mixer having a screw diameter of 50 mm and rotating at 200 r.p.m. The temperature in the mixer is 160° C and the pressure 30 atmospheres.

The mixture is let down via a flash valve to a pressure of three atmospheres and conveyed into a single screw extruder having a devolatilizing connection, the diameter of the screw being 50 mm. The n-pentane evaporates down to a content of 4.5 percent and the melt is thus cooled to 120° C. The extruder screw rotating at 100 r.p.m. forces the mixture under a pressure of 10 atmospheres from the die from which it emerges in the form of strands. These are drawn through a water bath at 20° C which is arranged immediately downstream of the die and then comminuted.

The n-pentane passes in a direction opposite to the direction of feed of the extruder and leaves at the rear end through an opening provided for the purpose and is withdrawn through a relief valve. It is then condensed in a condenser and supplied to a reservoir.

The granules obtained contain 4.5 percent of pentane and 0.2 percent of water. They may be expanded in a conventional manner by heating at atmospheric pressure to form expanded articles having very fine cells and a low density.

EXAMPLE 2

20 kg of a polystyrene melt (glass temperature 100° C) at 240° C and 15 kg of n-pentane at 20° C are supplied simultaneously but through separate feeds into a screw mixer similar to that used in Example 1.

The mixture is decompressed to 12.7 atmospheres absolute by means of a flash valve and supplied to a single-screw extruder similar to that used in Example 1. The n-pentane evaporates except for a residual content of 5 percent, the melt thus being cooled to 190° C. The gel is forced by the screw through the die at a pressure of more than 20 atmospheres absolute. The extrudate is immediately cooled with cold water and then subjected to size reduction.

We claim:

1. In a process for the continuous production of expandable thermoplastics wherein a melt of a styrene polymer is mixed with an expanding agent which is gaseous or liquid under standard temperature and pressure conditions at a pressure which is higher than the vapor pressure of the expanding agent in the mixture followed by lowering the pressure with rapid cooling to temperatures below the boiling point of the expanding agent in the mixture, the improvement which comprises: incorporating in the polymer from 15 to 200 percent by weight of expanding agent based on the weight of the polymer at a temperature of from 30° to 180° C above the glass temperature of the polymer and at a pressure above the vapor pressure of the expanding agent in the mixture; reducing the pressure on the mixture to below the vapor pressure of the expanding agent in the melt to flash evaporate a sufficient amount of the agent to lower the content of agent in the mixture to from 4 to 11 percent by weight without the addition of heat and thereby cool the mixture by means of the negative heat of expansion of the expanding agent; raising the pressure on the mixture above the vapor pressure of the expanding agent; and thereafter depressuring the mixture with rapid cooling to form strands or granules of the polymer containing said expanding agent.

2. A process as in claim 1 wherein the mixture which is at a pressure higher than the vapor pressure of the expanding agent is cooled to a temperature of 20° above to 60° C below the glass temperature.

3. A process as in claim 1 wherein the amount of expanding agent incorporated in the polymer is from 30 to 160 percent by weight with reference to said polymer.

4. A process as in claim 1 wherein the amount of expanding agent incorporated in the polymer is from 30 to 160 percent by weight.

* * * * *